(12) United States Patent
Bruniera et al.

(10) Patent No.: US 12,330,355 B2
(45) Date of Patent: Jun. 17, 2025

(54) NOZZLE TIP FOR INJECTION MOLDING

(71) Applicant: INGLASS S.P.A., San Polo di Piave (IT)

(72) Inventors: Pierangelo Bruniera, San Polo di Piave (IT); Alessandro Dario, San Polo di Piave (IT)

(73) Assignee: INGLASS S.P.A., San Polo di Piave (IT)

( * ) Notice: Subject to any disclaimer, the term of this patent is extended or adjusted under 35 U.S.C. 154(b) by 406 days.

(21) Appl. No.: 18/084,691

(22) Filed: Dec. 20, 2022

(65) Prior Publication Data

US 2023/0191674 A1 Jun. 22, 2023

(30) Foreign Application Priority Data

Dec. 20, 2021 (IT) .......................... 102021000031877

(51) Int. Cl.
*B29C 45/20* (2006.01)
*B29C 45/62* (2006.01)

(52) U.S. Cl.
CPC .............. *B29C 45/20* (2013.01); *B29C 45/62* (2013.01)

(58) Field of Classification Search
None
See application file for complete search history.

(56) References Cited

U.S. PATENT DOCUMENTS

| | | | |
|---|---|---|---|
| 7,037,103 B2 | 5/2006 | Niewels | |
| 7,972,132 B2 | 7/2011 | Klobucar et al. | |
| 10,384,384 B2 | 8/2019 | Rossi et al. | |
| 2019/0016031 A1* | 1/2019 | Bazzo | B29C 45/2806 |

* cited by examiner

*Primary Examiner* — Armand Melendez
(74) *Attorney, Agent, or Firm* — Rivka Friedman

(57) ABSTRACT

A nozzle tip for guiding a valve pin of a nozzle for injecting molten material into a mold during injection molding is described.

The nozzle tip consists of an outer member, provided with an axial pass-through cavity, which at one end comprises a central pass-through conduit for the exit of the molten material, an inner member, having an axial pass-through cavity, which is coaxially mounted within the outer member and comprises a tapered tip with a hole to direct the molten material to the central conduit, and an annular-shape insert made of wear-resistant material, with a central pass-through cavity into which the valve pin can slide and mounted in correspondence with the central pass-through conduit.

To prevent or mitigate wear, the central pass-through cavity of the insert is constituted of the juxtaposition of a cylindrical-shape cavity portion and a conical-shape cavity portion, and the insert is a separate piece and directly interposed between the tapered tip of the inner member and an inner surface of the outer member so that said tapered tip abuts against the inlet of the conical-shape cavity portion at a zone of mutual contact.

17 Claims, 2 Drawing Sheets

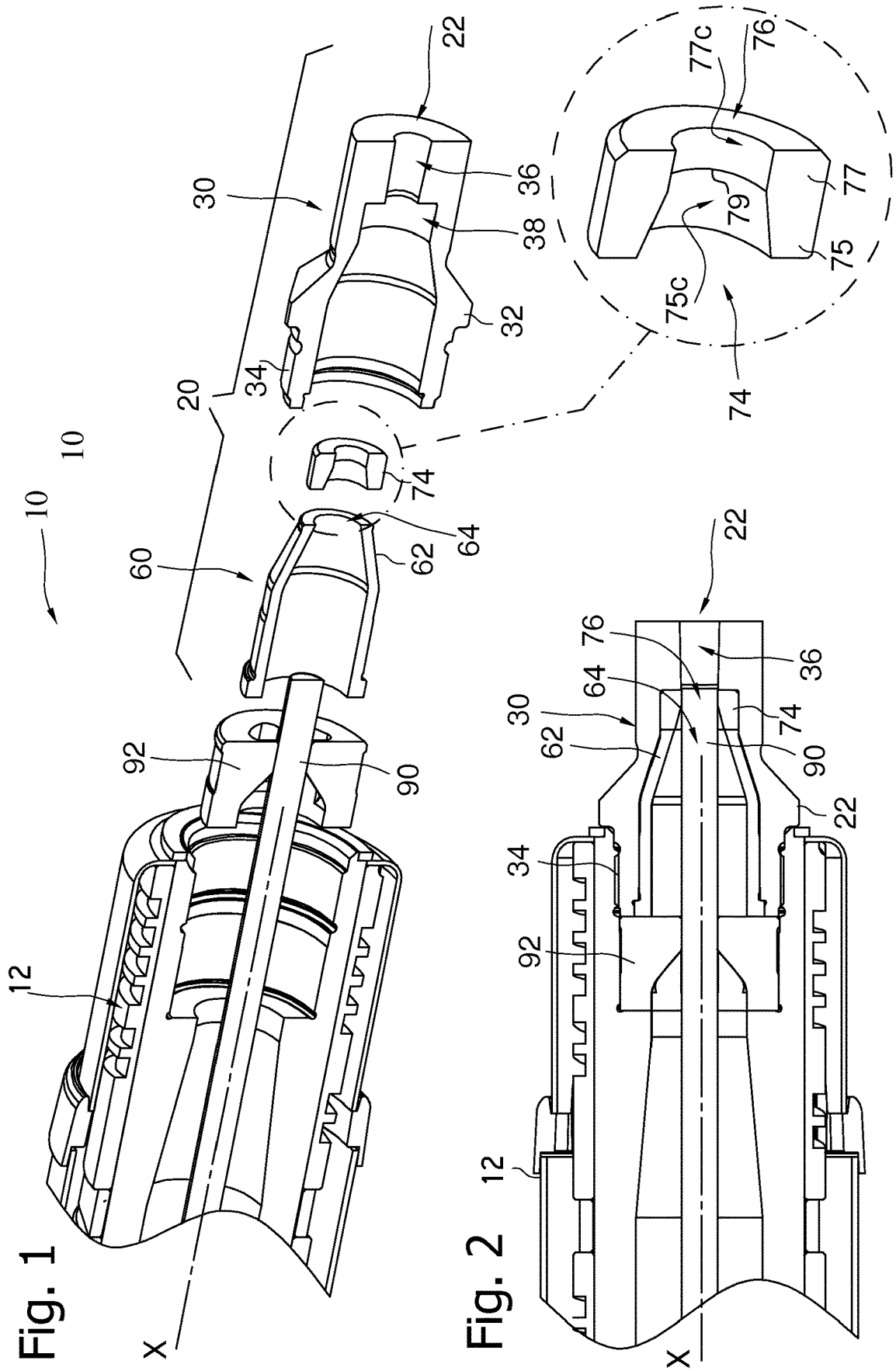

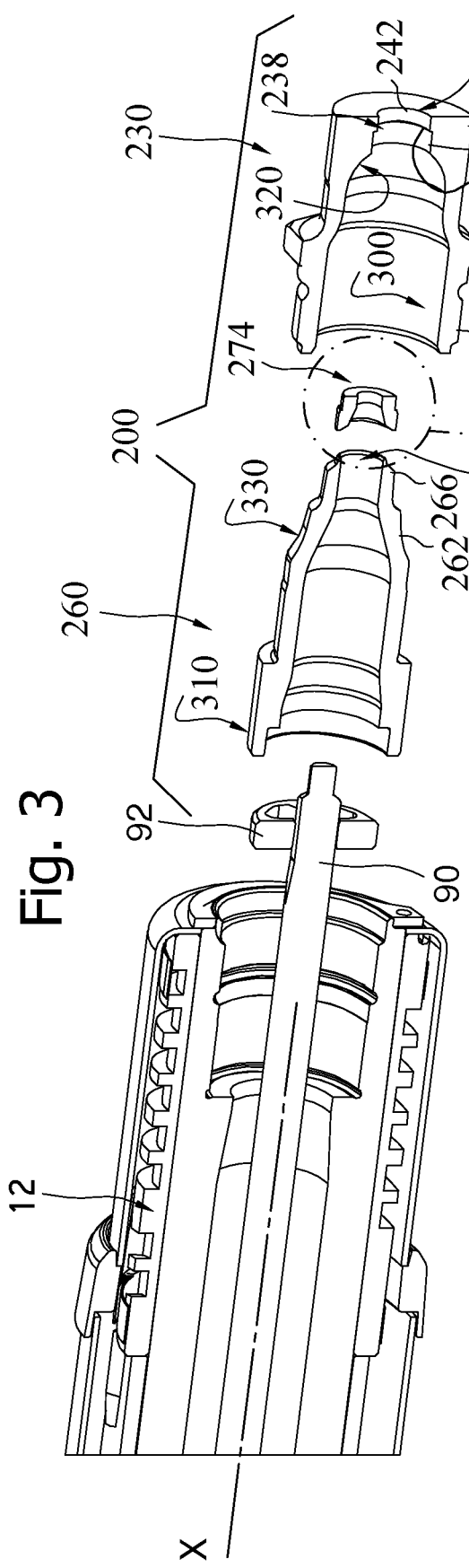
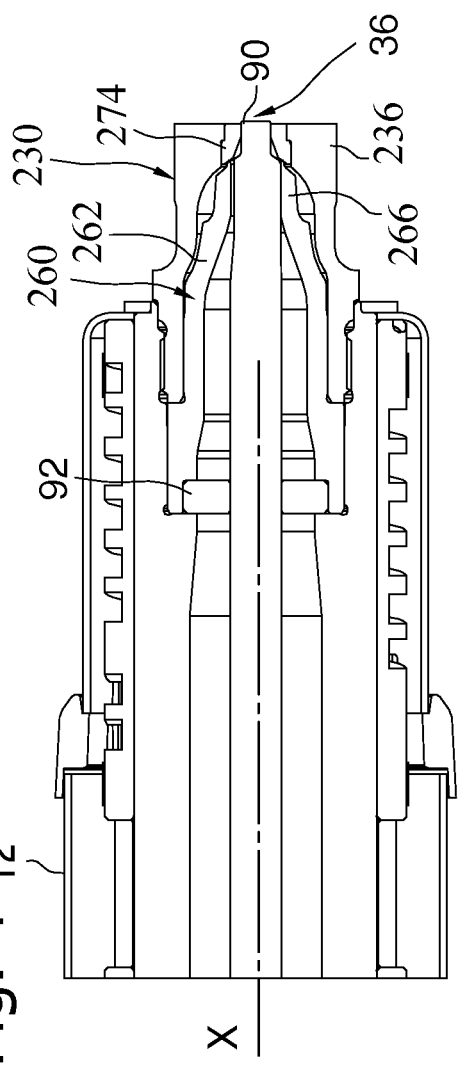

NOZZLE TIP FOR INJECTION MOLDING

TECHNICAL FIELD

The invention relates to an improved nozzle tip for injection molding.

BACKGROUND ART

In injection presses, which are taken here for example, molten material is injected into a mold through one or more injection nozzles, the opening and closing of which is controlled by a shutter (pin) guided by an actuator.

For a good fluidity of the injected material it is necessary to keep it at a high temperature, so the free end of the nozzle tip is usually made of a material having good thermal conductivity. But such material has neither wear hardness nor wear resistance, and can easily be deformed. On the other hand, if a material with high hardness were used, thermal conductivity would suffer.

Then some nozzle tips, see e.g. CN112895334A, conveniently integrate zones made of different materials, which however form a single body and are not removable, complicating maintenance operations and costs.

The main object of the invention, which is defined in the appended claims wherein the depending claims define advantageous variants, is to improve this state of the art.

Another object is to provide an improved nozzle tip for injection molding which is more resistant to wear.

Another object is to provide an improved nozzle tip for injection molding which has easier maintenance.

DISCLOSURE OF THE INVENTION

A nozzle tip is then proposed for guiding a valve pin of a nozzle for injecting molten material into a mold during injection molding, consisting of:
- an outer member, provided with an axial pass-through cavity, which at one end comprises a central conduit for the exit of the molten material,
- an inner member, provided with an axial pass-through cavity, which is mounted coaxially within the outer member and comprises a tapered tip with a hole for conveying the molten material toward the central conduit,
- an annular insert made of anti-wear material, with a central pass-through cavity into which the pin can slide and mounted at the central pass-through conduit,
- wherein the central pass-through cavity of the insert is constituted by the juxtaposition of a cylindrical shape cavity portion and a conical shaped cavity portion, and
- the insert is a separate piece and interposed directly between the tapered tip of the inner member and an inner surface of the outer member so that said tapered tip abuts against the inlet of the conical-shaped cavity portion at a mutual contact zone.

With this structure, the insert can be easily mounted in, or removed from, the nozzle tip, simplifying maintenance thereof. Moreover, in this way, a member of resistant material is placed in the nozzle tip at the area most affected by wear.

As a preferred variant, the central pass-through cavity of the insert, at the mutual contact zone, has a cross-section equal to said hole of the inner member, to maximize the coupling between the pieces.

As a simple and effective preferred assembly solution, the insert occupies a seat formed in the end of the outer member to form a portion of said central pass-through conduit (the central pass-through cavity of the insert is a portion of the central pass-through conduit). Therefore the insert does not face the mold cavity.

As another simple, effective and preferred assembly solution, the insert extends axially within a seat formed in the end of the outer member to completely form said central pass-through conduit (the central pass-through cavity of the insert delimits the entire central pass-through conduit). Therefore the insert faces the mold cavity.

For a more stable coupling, the insert preferably has on its outer surface a circular step of shape complementary to a step present in the seat.

Preferably the insert has toroidal shape.

As preferred materials for making the insert, tungsten carbide, or cemented carbide, or ceramic, or zirconium or materials with similar technical characteristics are selected.

Preferably, the end of the outer member consists of a cylindrical portion axially crossed at the center by said central conduit for the exit of the molten material. Thus the end of the outer member has a certain thickness that can be machined.

Preferably, the outer member is externally provided with a thread for coupling to an injector body.

Preferably, the outer member is provided with a cylindrical shell, which is externally machined to obtain said thread and has a diameter greater than that of said cylindrical portion.

In the nozzle tip, the central pass-through cavity of the insert has a cross-section which tapers toward the central pass-through conduit.

BRIEF DESCRIPTION OF THE DRAWINGS

The advantages of the invention will be even clearer from the following description of a preferred system, in which reference is made to the accompanying drawings in which FIG. 1 shows a partially exploded view of an injector with a first variation of the nozzle tip;

FIG. 2 shows the first variant of the nozzle tip as assembled;

FIG. 3 shows a partially exploded view of an injector with a second variation of the nozzle tip;

FIG. 4 shows the second variant of the nozzle tip as assembled.

BEST MODE FOR CARRYING OUT THE INVENTION

In the figures equal elements are indicated by equal numbers.

Reference is made to FIG. 1, which shows a portion of a first variant of injector 10 for transferring molten material into a mold (not shown).

The injector 10 is usually mounted within one or more plates that make up the mold, is fixed to a known distributing collector for the distribution of the molten plastic material (the so-called manifold, not shown), and is composed of a body 12 that ends with a nozzle tip 20. At the opposite end the injector is fixed to the manifold.

Inside the injector 10, a valve pin 90 is linearly movable along an axis X—in a known manner—to open and close a nozzle 22 of the nozzle tip 20 allowing or limiting the flow of molten material toward the mold cavity. In order to better guide the motion of the valve pin 90, a (optional) centering ring 92 is provided inside the injector body 12.

The nozzle tip 20 is composed of two pieces mounted coaxially one inside the other: an outer member (or ring nut) 30 and an inner member 60.

The outer member 30 is axially hollow (along X), is cup-shaped, and consists of a substantially cylindrical body 32 which is externally provided with a thread 34 for coupling to the body 12 and which terminates at one end with a central pass-through nozzle or conduit 36 for the molten material.

The end with the central nozzle or pass-through conduit 36 is preferably a cylindrical portion, to adapt its resting on the mold and have more mass (better thermal flywheel).

The inner member 60 is also axially hollow, cup-shaped and comprises a tapered tip 62 with a hole 64 for conveying the molten material toward the central pass-through conduit 36.

In the nozzle tip 20 there is also an insert 74 of annular or toroidal shape made of anti-wear material with a central pass-through cavity 76 in which the valve pin 90 can slide. The anti-wear material is, for example, a material used to make tools, such as tungsten carbide, cemented carbide, ceramic or zirconium.

As can be seen from FIG. 2, the insert 74 is mounted at the central pass-through conduit 36 and is interposed directly between the tapered tip 62 and the inlet of the central pass-through conduit 36.

The insert 74 is formed by the union of a first portion 75, which faces the hole 64, and a second portion 77, coaxial with the first, which faces the central pass-through conduit 36 and has a cylindrical cavity inside it.

The first portion 75 defines an inner cavity 75c of conical shape, while the second portion 77 defines an inner cavity 77c which is of cylindrical shape and is coaxial with the cavity 75c. The cavity 76 is the juxtaposition of the cavities 75c, 77c, therefore it turns out tapered and there is a circular edge 79 at the junction of the cavities 75c, 77c. In the nozzle tip 20, the insert 74 occupies a seat 38 formed at the end of the outer member 30, at the inlet of the central pass-through conduit 36. The seat 38 is diametrically wider than the central pass-through conduit 36, so that the pass-through cavity 76 itself constitutes a portion of the central pass-through conduit 36. In particular, the portion 75 of the insert 74, i.e. the portion with the conical pass-through cavity 75c within it, is the portion closest to—and preferably in contact with—the tapered tip 62. Thus, the hole 64 communicates directly with the conical pass-through cavity 75c and the cylindrical cavity 77c communicates directly with the central pass-through conduit 36.

The assembled nozzle tip 20 (FIG. 2) envisages the abutment of the tip 62 against the portion 75 of the insert 74, both located inside the outer member 30. The insert 74 in turn is housed within the seat 38 and isolates the tip 62 from the inner surface of the outer member 30. In particular, the portion 75 connects with the tip 62 so that the cavity 75c and the hole 64 are connected with continuity.

This structure makes it possible to build with hard material the zone of the nozzle tip 20 which is more subject to wear. When the pin 90 moves toward the closed position, the most stressed area by the squashing of the material against the inner walls is precisely the transition zone from conical to cylindrical cross-section, corresponding approximately to the edge 79. In the long run, immediately past the edge 79 the inner surfaces 75c (conical) and 77c (cylindrical) get damaged/worn, and wear propagates over time. Such wear is particularly important since it determines the seal of the nozzle tip 20 (it prevents leakage of the nozzle tip toward the mold cavity). In fact, in the closed position of the nozzle, see FIG. 2, the end of the pin 90 occupies the whole cylindrical cross-section delimited by the cavity until it gets past, for a limited length, the insert 74. The central conduit 36 is not occupied by the pin 90 but is filled with plastic material which solidifies.

The aforesaid wear increases considerably if the plastic material contains significant percentages of fibers (carbon, glass, etc.).

Having introduced the insert 74, which comprises the edge 79, in case of excessive wear only that can be replaced. Moreover, making the entire nozzle tip 20 of hard material is economically unfeasible as well as impossible because the end 22 must be often machined/shaped to be adapted to the mold cavity. Without the insert 74 it would be necessary to replace the entire nozzle tip 20.

The insert 74 may be advantageously housed and fixed inside the seat 38 by interference of diameters (more or less blocked) or keyed.

An additional advantage of the nozzle tip 20 is that the end 22 of the tip remains of a material which can be machined as required (e.g. by making an inclined or curved outer surface).

FIGS. 3 and 4 show a second variant of nozzle tip 200 with the same function as the nozzle tip 20. Reference numerals to the same or similar parts are increased by 200. As before, the nozzle tip 200 is composed of two pieces coaxially mounted one inside the other: an outer member or ring nut 230 and an inner member 260.

The inner member 260 is substantially the same as the inner member 60, except that the tapered tip 262 terminates with a sleeve 266 of approximately constant cross-section.

The outer member 230 is axially hollow (along X), and consists of a substantially cylindrical body 232 terminating at one end 236. The outer member 230 differs from the outer member 30 in the shape of the seat 238 obtained at its end 236. Here, the seat 238 crosses along X the entire thickness of the end 236 and comprises two adjacent portions 240, 242 having a decreasing cross-section and forming a step 244 therebetween.

Also present in the nozzle tip 200 is an annular or toroidal insert 274 made of anti-wear material, such as for the insert 74, with a central pass-through cavity 276 in which the valve pin 90 can slide. The insert 274 is formed of two portions 275, 277 having a decreasing cross-section and externally forming a step 280 therebetween. Internally, the portion 275 has a cavity 275c of conical shape, while the portion 277 has a cavity 277c of cylindrical shape, similar to the insert 74. The cavities 275c, 277c form an edge 279, similar to the edge 79 of the insert 74.

As can be seen from FIG. 4, the insert 274 is mounted at the end 236 in the seat 238. The assembled nozzle tip 200 envisages the abutment of the sleeve 266 against the portion 275 of the insert 274, both located inside the outer member 230. The insert 274 is housed within the seat 238 and insulates the apex of the tapered tip 262, that is, the sleeve 266, from the inner surface of the outer member 230.

The two portions 275, 277 have a shape complementary to the portions 240, 242 and the step 244 matches the step 280, respectively. In this way the pass-through cavity 277 completely constitutes the inner walls of the central pass-through conduit 36, and in particular the portion 275 is the element closest to—and in particular in contact with—the apex of the tapered tip 262. Thus, the hole 64 in the sleeve 266 communicates directly with the pass-through cavity 275c. In particular, the portion 275 is connected to the sleeve 266 so that the cavity 275c and the hole 64 are connected with continuity.

The general advantages described for the first variant also apply to the second variant. An additional advantage of the second variant is the possibility of injecting directly into the cavity without necessarily creating a sprue in the channel 36.

The contrast to wear is also obtained if the edge 79, 279 is not a sharp edge or cusp but just only a slope-change zone for the cavity 76, 276.

In the two variants, the tip of the pin 90 has the same cross-section as the cavity 77c, 277c so that at such cavity the pin 90 can plug them and thus inhibit the exit of material from the central pass-through conduit 36. The cavities 75c, 275c are wider and tapered, and serve to create an injected flow variation proportional to the axial displacement of the pin 90 as it retracts from—or is about to arrive into—the cavity 77c, 277c.

Preferably, in the above two variants, it is possible that, for greater stability, the outer member 30, 230 comprises a substantially cylindrical inner surface 300 and the inner member 60, 260 comprises a substantially cylindrical outer surface 310, and the substantially cylindrical outer surface 310 contacts the substantially cylindrical inner surface 300.

The invention claimed is:

1. Nozzle tip for guiding a valve pin of a nozzle for injecting molten material into a mold during injection molding, consisting of:
    an outer member, provided with an axial pass-through cavity, which at one end comprises a central pass-through conduit for the exit of the molten material,
    an inner member, having an axial pass-through cavity, which is coaxially mounted within the outer member and comprises a tapered tip with a hole to direct the molten material to the central conduit,
    an annular-shape insert made of wear-resistant material, with a central pass-through cavity into which the valve pin can slide and mounted in correspondence with the central pass-through conduit,
    wherein the central pass-through cavity of the insert is constituted of the juxtaposition of a cylindrical-shape cavity portion and a conical-shape cavity portion, and
    the insert is a separate piece and directly interposed between the tapered tip of the inner member and an inner surface of the outer member so that said tapered tip abuts against the inlet of the conical-shape cavity portion at a zone of mutual contact.

2. Nozzle tip according to claim 1, wherein the central pass-through cavity of the insert, at the zone of mutual contact, has a cross-section equal to said hole of the inner member.

3. Nozzle tip according to claim 1, wherein the insert occupies a seat formed in the end of the outer member to form a portion of said central pass-through conduit.

4. Nozzle tip according to claim 2, wherein the insert occupies a seat formed in the end of the outer member to form a portion of said central pass-through conduit.

5. Nozzle tip according to claim 1, wherein the insert extends axially within a seat formed in the end of the outer member to completely form said central pass-through conduit.

6. Nozzle tip according to claim 2, wherein the insert extends axially within a seat formed in the end of the outer member to completely form said central pass-through conduit.

7. Nozzle tip according to claim 5, wherein the insert has on its outer surface a circular step of a shape complementary to a step present in the seat.

8. Nozzle tip according to claim 6, wherein the insert has on its outer surface a circular step of a shape complementary to a step present in the seat.

9. Nozzle tip according to claim 1, wherein the insert has toroidal shape.

10. Nozzle tip according to claim 1, wherein the insert is made of tungsten carbide or cemented carbide or ceramic or zirconium.

11. Nozzle tip according to claim 1, wherein the end of the outer member consists of a cylindrical portion axially crossed at the center by said central conduit for the exit of the molten material.

12. Nozzle tip according to claim 2, wherein the end of the outer member consists of a cylindrical portion axially crossed at the center by said central conduit for the exit of the molten material.

13. Nozzle tip according to claim 3, wherein the end of the outer member consists of a cylindrical portion axially crossed at the center by said central conduit for the exit of the molten material.

14. Nozzle tip according to claim 4, wherein the end of the outer member consists of a cylindrical portion axially crossed at the center by said central conduit for the exit of the molten material.

15. Nozzle tip according to claim 5, wherein the end of the outer member consists of a cylindrical portion axially crossed at the center by said central conduit for the exit of the molten material.

16. Nozzle tip according to claim 1, wherein the outer member is externally provided with a thread for coupling to an injector body.

17. Nozzle tip according to claim 16, wherein the outer member is provided with a cylindrical shell, which is externally machined to obtain said thread and has a diameter greater than that of said cylindrical portion.

* * * * *